United States Patent
De Campos Ruao Da Cunha

(10) Patent No.: US 10,865,770 B2
(45) Date of Patent: Dec. 15, 2020

(54) COMBINED OMNIDIRECTIONAL FLOW TURBINE SYSTEM

(71) Applicant: Antonio Pedro De Campos Ruao Da Cunha, Paredes (PT)

(72) Inventor: Antonio Pedro De Campos Ruao Da Cunha, Paredes (PT)

(73) Assignee: OMNIFLOW S.A., Oporto (PT)

( * ) Notice: Subject to any disclaimer, the term of this patent is extended or adjusted under 35 U.S.C. 154(b) by 315 days.

(21) Appl. No.: 16/018,722

(22) Filed: Jun. 26, 2018

(65) Prior Publication Data

US 2018/0355844 A1    Dec. 13, 2018

Related U.S. Application Data

(63) Continuation-in-part of application No. 15/725,850, filed on Oct. 5, 2017, now abandoned, which is a
(Continued)

(30) Foreign Application Priority Data

Sep. 26, 2011    (PT) ......................................... 105905

(51) Int. Cl.
*F03D 3/04*    (2006.01)
*F03D 1/04*    (2006.01)
(Continued)

(52) U.S. Cl.
CPC .............. *F03D 3/0409* (2013.01); *F03B 3/04* (2013.01); *F03B 17/063* (2013.01); *F03D 1/02* (2013.01);
(Continued)

(58) Field of Classification Search
CPC . F03D 1/04; F03D 3/0409; F03D 7/06; F03D 9/007; F03D 9/25; F03D 17/063;
(Continued)

(56) References Cited

U.S. PATENT DOCUMENTS

| 4,508,973 A | 4/1985 | Payne |
| 2002/0036407 A1 | 3/2002 | Ferraro |

(Continued)

FOREIGN PATENT DOCUMENTS

| EP | 2264309 A2 | 12/2010 |
| GB | 2269859 A | 2/1994 |

(Continued)

OTHER PUBLICATIONS

International Preliminary Report on Patentability for International Application No. PCT/IB2012/055128 (6 Pages) (dated Apr. 1, 2014).

(Continued)

*Primary Examiner* — Audrey K Bradley
(74) *Attorney, Agent, or Firm* — Lucas & Mercanti, LLP

(57) ABSTRACT

A combined omnidirectional flow turbine system includes rotors that are disposed in a vertical position and enclosed in a motionless structure that receives air flows from any external direction which are manipulated by an airfoil to cause the rotors to rotate. The motionless structure is a hollow body and it is formed by a support structure and cover, being said interior space adapted to store electronic components, which can be directly supplied by the energy, produced. On its outer surface, air particles and pollutants filters can be installed, taking advantage of the aerodynamic shape of the motionless structure, which promotes air flow adhesion along its surface, making possible to capture particles along their preferred path.

14 Claims, 8 Drawing Sheets

Related U.S. Application Data continuation-in-part of application No. 14/226,427, filed on Mar. 26, 2014, now abandoned, which is a continuation-in-part of application No. PCT/IB2012/055128, filed on Sep. 26, 2012.

(51) Int. Cl.

| | | |
|---|---|---|
| *F03D 7/06* | (2006.01) | |
| *F03D 9/00* | (2016.01) | |
| *F03D 9/11* | (2016.01) | |
| *F03D 9/25* | (2016.05) | |
| *H02S 10/12* | (2014.01) | |
| *F03B 17/06* | (2006.01) | |
| *F03B 3/04* | (2006.01) | |
| *F03D 1/02* | (2006.01) | |

(52) U.S. Cl.
CPC ............. *F03D 1/04* (2013.01); *F03D 7/06* (2013.01); *F03D 9/007* (2013.01); *F03D 9/11* (2016.05); *F03D 9/25* (2016.05); *H02S 10/12* (2014.12); *F05B 2220/708* (2013.01); *F05B 2240/131* (2013.01); *F05B 2240/132* (2013.01); *F05B 2240/133* (2013.01); *F05B 2260/99* (2013.01)

(58) Field of Classification Search
CPC .......... F05B 2220/708; F05B 2240/131; F05B 2240/132; F05B 2240/133; F01D 9/11; H02S 10/12; Y02E 10/72
See application file for complete search history.

(56) References Cited

U.S. PATENT DOCUMENTS

| | | |
|---|---|---|
| 2003/0178856 A1 | 9/2003 | Ohya et al. |
| 2008/0023964 A1 | 1/2008 | Sureshan |
| 2008/0292456 A1 | 11/2008 | Raynal |
| 2009/0315332 A1 | 12/2009 | Sheikhrezai |
| 2015/0152849 A1* | 6/2015 | Allaei .................. F03D 9/255 290/55 |
| 2015/0322920 A1 | 11/2015 | Jones |
| 2016/0065115 A1 | 3/2016 | Pugina |
| 2016/0215760 A1* | 7/2016 | Powell .................. F03D 1/02 |

FOREIGN PATENT DOCUMENTS

| | | |
|---|---|---|
| WO | 2006066310 A1 | 6/2006 |
| WO | 2008017106 A1 | 2/2008 |
| WO | 2010098656 A2 | 9/2010 |

OTHER PUBLICATIONS

International Search Report and Written Opinion for International Application No. PCT/IB2012/055128 (12 Pages) (dated Jan. 31, 2013).

* cited by examiner

COMBINED OMNIDIRECTIONAL FLOW TURBINE SYSTEM

CROSS-REFERENCE TO RELATED APPLICATIONS

This application is a continuation-in-part of U.S. application Ser. No. 15/725,850, filed on Oct. 5, 2017, which is a continuation-in-part of U.S. application Ser. No. 14/226,427, filed on Mar. 26, 2014 which in turn is a continuation-in-part of PCT/IB2012/055128, filed Sep. 26, 2012, which claims the benefit of priority from Portuguese Application No. 105905 filed Sep. 26, 2011, the contents of each of which are incorporated herein by reference.

FIELD OF THE INVENTION

This invention concerns energy production, specifically referring to a device conceived to improve efficiency levels associated to wind energy production and also on other fluids, like ocean currents and waves.

BACKGROUND OF THE INVENTION

The omnidirectional airfoil diffuser directs the fluid to the central vertical axis turbine. The fluid tends to be attached to the surface of the diffuser by an effect known as Coanda effect. The principle was first described by the Romanian Henri Coanda, who was the first to recognize the practical application of the phenomenon in aircraft development. The structure of the inverted wing diffuser presents a behavior similar to an aircraft flying at lower speeds or an F1 rear wing. In all these situations the wing presents high attack angles, so solutions like vortex generators, slats and slotted brims may be adopted in the surface of the aerodynamic profile in order prevent the detachment known as stall. In this case the wing is not linear but the profile evolves radially and, therefore, presents an identical behavior regardless of the direction of the wind.

The wind speed is extremely important for the amount of energy a wind turbine can convert into electricity. The energy content of the wind varies with the cube of the average wind speed. If the wind speed is twice as high, it contains eight times as much energy.

The design of the diffuser promotes wind acceleration due to its inverted wing geometry. This enables the central turbine to reach a higher rotation and produce more energy, besides starting to produce energy sooner.

Taking into account the current disadvantages of the conventional turbines already disclosed in document EP226309, the now disclosed invention presents an energy producing device that:

1. Has low environmental and visual impact;
2. Has a high energy production;
3. Has the ability to work with low wind speed, with turbulent wind and wind of variable direction; typical features of an urban environment;
4. It does not present the disadvantage of having visible moving parts and the inherent shade and shining effects;
5. Low noise generation enabling the positioning close to people and housing.

SUMMARY OF THE INVENTION

The present invention describes a combined omnidirectional flow turbine comprising:

one or more rotors placed in a vertical position, each of the one or more rotors including blades;
a motionless structure comprising a single aerodynamic element with the shape of an inverted radial wing surrounding laterally the one or more rotors therein and including an inner sidewall which is continuously curved and bulges inwardly extending in a direction toward the one or more rotors from bottom intake flow to top exhaust flow;
an energy transformation element connected to the one or more rotors to convert mechanical energy to electrical energy;
said combined omnidirectional flow turbine characterized by the motionless structure being a hollow body comprising:
a support structure and a cover, said cover being mounted to the support structure through a fixation mechanism, wherein the interior space of the motionless structure is adapted to store at least one electronic component; and
an electronic supply adaptation circuit, connected to the energy transformation element, configured to actuate said at least one electronic component.

In relation to the aerodynamic profiles that may be used in the aerodynamic shape of the inverted radial wing (1; 9), these profiles may vary within the following intervals:

Thickness: 1-20%; preferably 2-15%, more preferably 5-8%;
Camber: 5%-25%, preferably 8-15%, more preferably 10-12%;
Point of maximum Camber: 1-8; preferably 2-7, more preferably 3-4;

The aerodynamic shape may be described according to the standard of the National Advisory Committee for Aeronautics (NACA).

In an embodiment of the invention, each of the sidewalls of the motionless structure includes one or more airfoil components.

In yet another embodiment of the invention, the turbine employs secondary flows from HVAC systems.

In one embodiment of the invention, the energy transformation element is disposed in a center area of the turbine.

In another embodiment of the invention, the energy transformation element is an electric generator.

In yet another embodiment of the invention, the top cover's outer surface of the motionless structure is covered with photovoltaic cells.

In an embodiment of the invention, the fixation mechanism between the support structure and the cover of the motionless structure is screw type.

In another embodiment of the invention the motionless structure further comprises a mounting mast connected to the support structure.

In yet another embodiment of the invention, the motionless structure comprises a metallic material, a composite material, a concrete or textile material.

In an embodiment of the invention, the motionless structure surface is of a radiofrequency-wave-transparent material.

In an embodiment of the invention, the combined omnidirectional flow turbine system further comprises a Peltier device.

In an embodiment of the invention, the combined omnidirectional flow turbine system comprises lighting systems.

On this application, is also described a luminaire that comprises the turbine as above described.

DESCRIPTION OF THE INVENTION

The present invention describes an effective turbine in maximizing the energy that can be derived with a rotor in a fluid. The combined omnidirectional flow turbine system developed uses a rotor (2) similar to a conventional turbine with a horizontal axle but placed in a vertical position inserted in a static diffuser with the shape of an inverted wing. This motionless structure (1) is influenced by two combined flows, enhancing the energy produced by the rotor (2).

The rotor (2) is attached to an element for transforming the mechanic energy integrated in the structure (1) with an inverted wing aerodynamic shape. This particular shape for the motionless structure provides the air flow adhesion along its surface. Due to that fact, a filter is applied into the structure's surface to capture air particles, capturing the particles and pollutants from the air flow. With multiple units applied to a city scale this filters will actively reduce pollutants in the air. The system does not have an orientation mechanism with the direction of the wind since it is completely omnidirectional and presents only one moving part, the rotor (2) with blades (3). The turbine may also comprise an aerodynamic deflector with a brim (6) in the upper portion of the structure (1).

This invention is applicable in the industry of energy production, namely in micro-generation, as well as large power systems.

The invention described herein comprises a motionless structure with a diffuser with the shape of an inverted wing that directs a fluid, namely the wind, from any direction, omnidirectional, and directs/speeds the fluid to a rotor of vertical axis located in the center of the diffuser. Therefore, the rotor does not have to align itself with the direction of the fluid, as is the case with the turbines of horizontal axis.

The device operates with two combined flows. The lower flow and the upper flow. In the lower flow the fluid is directed in an ascending direction towards the central turbine independently of its direction. As a result of the aerodynamic profile the flow is accelerated in an interval comprised between 1.4× and 1.8×, constituting, thus, the lower flow speed. At the time, the flow passes through the rotor that withdraws a part of its kinetic energy. The upper flow passes through the upper area of the device and combines itself with the lower flow causing an aspiration effect in the turbine resulting from this low pressure area.

Due to this combination of upper and lower flows, the area that influences the turbine is larger than the area of the rotor. This situation does not happen with any other turbine model known in the state of the art. As a result of this influence in the combination of both flows, the ratio of mechanical power may reach a value higher than 0.593, which makes that this rotor does not share the same conditions defined in the upper limit of the extractable power in the flow indicated by BETZ.

In order to enhance the lower flow and prevent its separation from the surface, the structure may be divided in multi-elements (9) of aerodynamic profiles, namely in 2, 3 or 4 elements (see FIGS. 2, 3, 6). Furthermore, the development of turbulence in the inner surface may have a positive effect in preventing the flow separation, so that the use of the vortex generators and/or areas with texture on the surface may be applied, for example, similar to the embossments in the golf balls. Besides that, the motionless structure includes at least one filter installed to its outside side wall. In fact, due to its inverted wing aerodynamic shape, which provides air flow adhesion along the structure's surface, the use of such an element helps to capture air particles and pollutants from the air flow. The filter is installed in the outside surface of the structure by means of a mechanical connection, and it can be based on electrostatic, HEPA, Activated Carbon Technology or any other technology apparent to a person skilled in the art. The filter can be removed and cleaned or replaced for continuous optimal operation.

As a result of its geometry, the now presented device promotes the acceleration of the flow, preferably in the area of the tip of the blade of the central turbine that, as a result of this factor, presents a higher torque. This allows a smaller turbine to have a performance higher than the one of a conventional turbine, increasing the efficiency.

Since the turbine has a smaller diameter, the dimension of the blades shall be smaller which reduces the production costs and enables the possibility of using not only high performance materials such as composites and magnesium alloys but also materials of high production rate and low cost, such as injected polymers.

Since the turbine is in the horizontal central position and it does not need to align with the direction of the wind, the device enables the use of secondary flows from HVAC (Heating, Ventilation and Air Conditioning) systems, such as forced air-aspiration, ventilation, air-conditioning, etc. It, thus, allows the cogeneration operation, recovering some of the energy used to activate these devices.

Since they do not have an orientation mechanism with the direction of the wind, the mechanical parts are the simplest and the easiest to maintain. The generator may be located at the center of the turbine or at the ground level for an easier maintenance. In this last situation, the rotor shall be connected to the generator in the soil by a shaft.

Taking into account that the tip of the blade is clear from any obstacle, such as the tower, and all the rotor is protected by the diffuser, the noise emitted by the apparatus is much lower, which represents an advantage with the reduction of the emission of noise, enabling also the operation of the rotor with higher rotation. A generator of higher rotation requires less permanent magnets, which renders the generator less expensive.

The entire structure is scalable to the available area and the required needs, and the structure can be divided in multiple sections in order to simplify the transport and the assembly.

The outer surface of the structure can be covered with photovoltaic cells (6a, 9a) so that the motionless surface is actively used and the energy production is maximized.

This invention is also capable of being installed at sea with floating devices in order to explore off-shore winds, and also be placed underwater and explore ocean currents and waves.

The support mast may accommodate additional diffusers in order to balance the systems before a certain situation. Therefore, the system may, under certain conditions, be subject to corrections of an aerodynamic type.

The outer surface of the motionless structure may be graphically decorated. Therefore, it may be used to convey a message and be used for advertising purposes.

The motionless structure is a hollow body, formed by two parts that are coupled through a fixation mechanism: support structure and cover part. Due to its geometric shape, it can be projected to allow the use of its interior space as a storage medium for, but not exclusively to, electronic components, such as batteries or communication devices. These components will be supplied directly from the energy produced by the turbine by means of an electronic supply adaptation circuit, also installed inside the diffuser, connected to the energy transforming element.

With this approach the efficiency of the turbine is enhanced, in what concerns to electric power transmission, since the power losses due to transmission and distribution losses are reduced.

Example of a typical small installation:
Turbine: 1.70 m diameter
Rated Power (Wind): 1.08 kW at 11.0 m/s (60% efficiency)
Maximum Power (Wind): 2.00 kW at 15.0 m/s
Annual Wind Production (estimated): 2190 kW/year+ Photovoltaic Solar Cells Annual Production: 2890 kW/year (wind+solar)
Reduction of 70% in the energy bill of an average house, or 100% of an efficient modern house.

BRIEF DESCRIPTION OF FIGURES

For an easier understanding of the invention we attach hereto the figures that represent preferred embodiments of the invention but do not intend to serve as a constraint to the object of the present invention.

EXAMPLE OF AN EMBODIMENT OF THE INVENTION

Referring to the figures, it will be now described a preferred embodiment of the invention.

The device of the invention consists of a motionless inverted wing structure (1), with a large area of exposure to the flow. This motionless structure (1) can also be divided in at least two or more aerodynamic elements, i.e., multi-elements (9) in order to improve its performance. The aerodynamic elements can also have slots and slats to ensure enhanced flow attachment and prevent stall in the wing.

Figure 1:
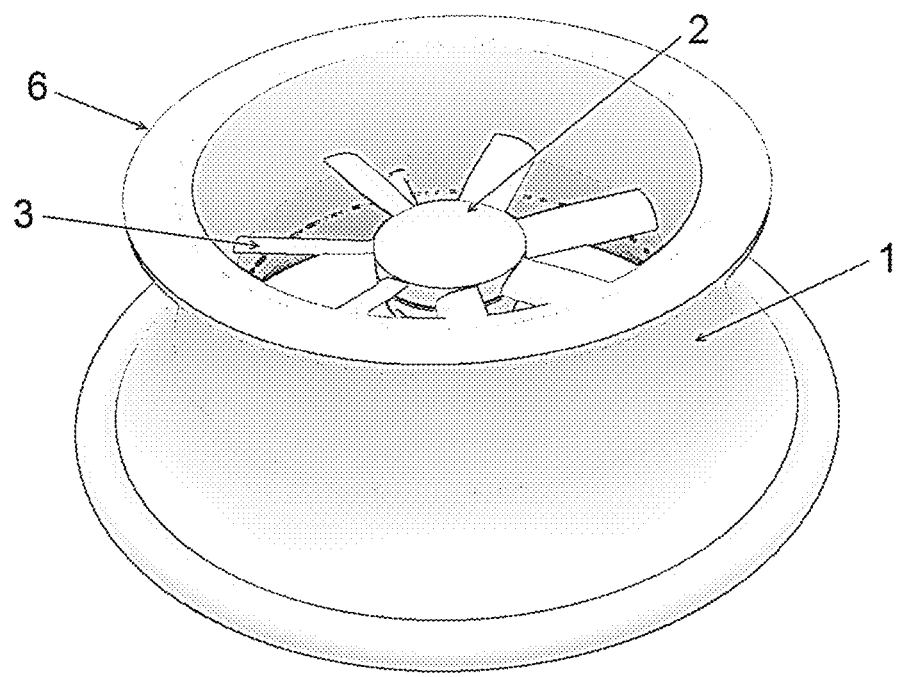
FIG. 1 is a schematic representation in isometric view of the device of the invention—Option of a structure with a single aerodynamic element with the shape of an inverted wing. In this figure the following elements are comprised:
1—motionless structure;
2—central rotor;
3—rotor blade;
6—brim.
Figure 2:
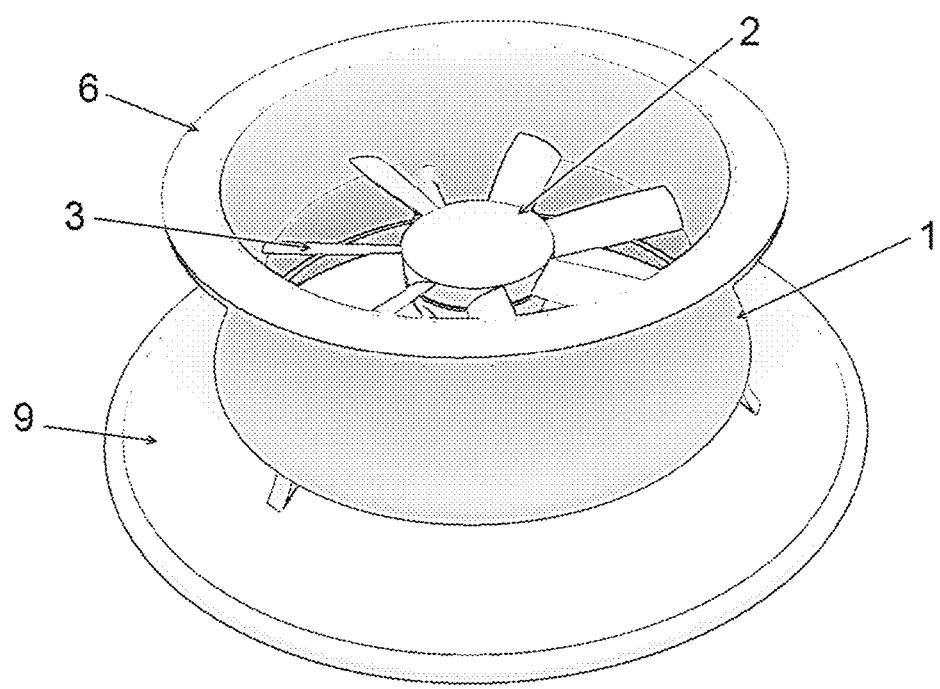
FIG. 2 is a schematic representation in isometric view of the device of the invention—Option of a structure with two aerodynamic elements in shape of an inverted wing. In this figure the following elements are comprised:
1—motionless structure;
2—central rotor;
3—rotor blade;
6—brim
9—aerodynamic multi-elements.
Figure 3:
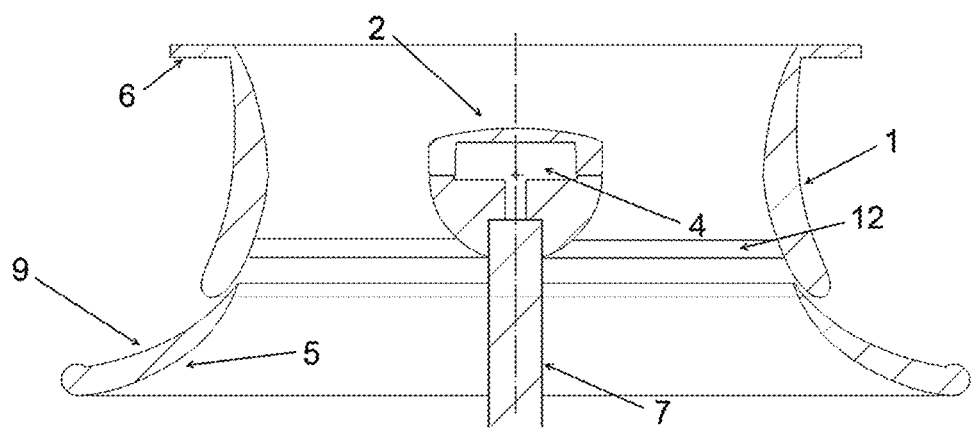
FIG. 3 is a schematic representation of a side view of the device with two multi-elements. In this figure the following elements are comprised:
1—motionless structure;
2—central rotor;
4—element for the transformation of the mechanical energy namely an electric generator;
5—lower flow;
6—brim;
7—mounting mast;
9—aerodynamic multi-element;
12—support structure.
Figure 3A:
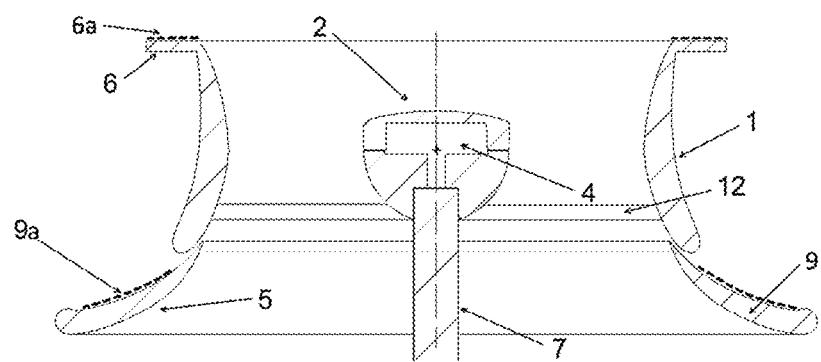
FIG. 3a is a view of a modified embodiment which is only different from FIG. 3 in that photovoltaic cells (6a, 9a) cover the outer surface of the structure (6, 9).
Figure 4:
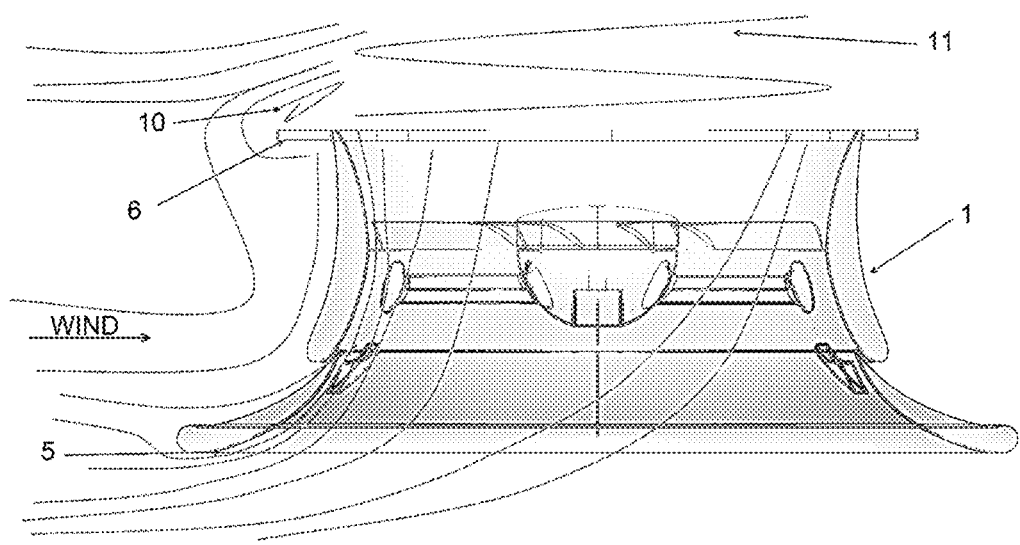
FIG. 4 is a schematic representation of a side view of the flow through the device. In this figure the following elements are comprised:
1—motionless structure;
5—lower flow;
6—brim;
10—vorticity
11—upper flow.
Figure 5:
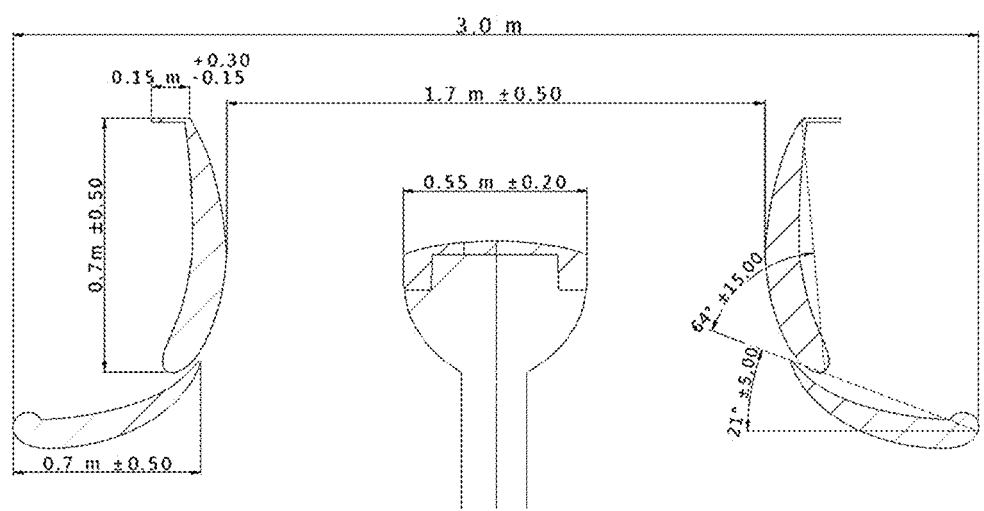
FIG. 5 is a schematic representation of a side view of a preferred embodiment of a 3 meter device, where:
the angle of the 1st wing can vary between 54°±15°, the dimensions between 0.7 m±0.5 m;
the angle of the 2nd wing can vary between 21°±5°, the dimensions between 0.7 m±0.5 m;
the dimension of the rotor varies between 0.55 m±0.2 m;
the dimension of the deflector between 0.15 m+(0.3 m; −0.15 m).
Figure 6:
FIG. 6 is a schematic representation of a side view of possible arrangements of the aerodynamic multi-elements of the inverted wing with, namely, 1, 2, 3 elements that may, on the other hand, see their angle vary.
Figure 7:
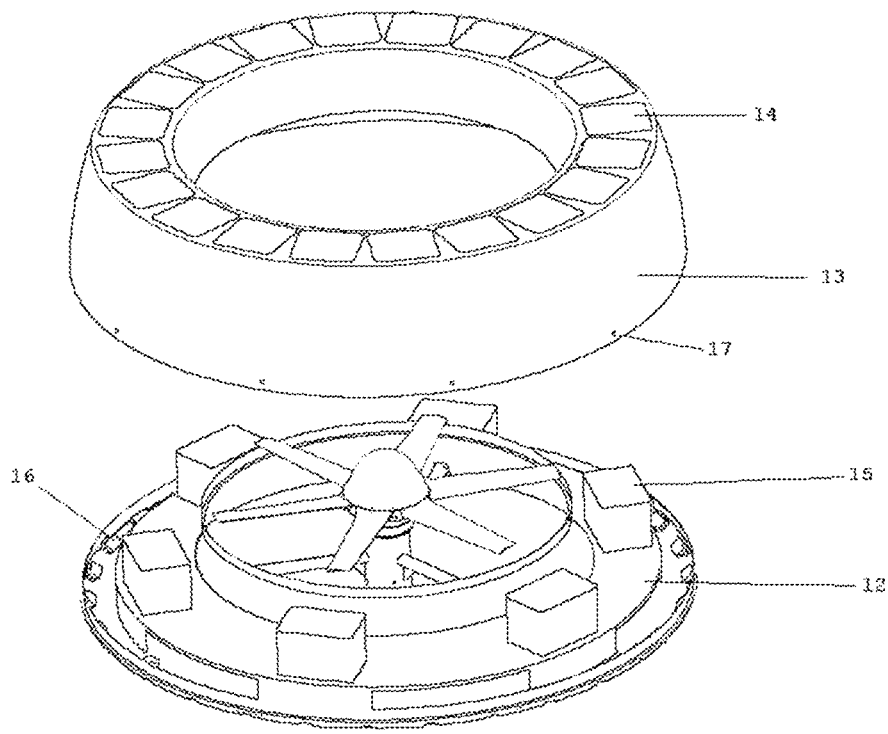
FIG. 7 illustrates the inside space of the motionless structure, comprising the following elements:
12—support structure;
13—cover;
14—photovoltaic cells;
15—battery;
16—LED;
17—fixation mechanism.
Figure 8:
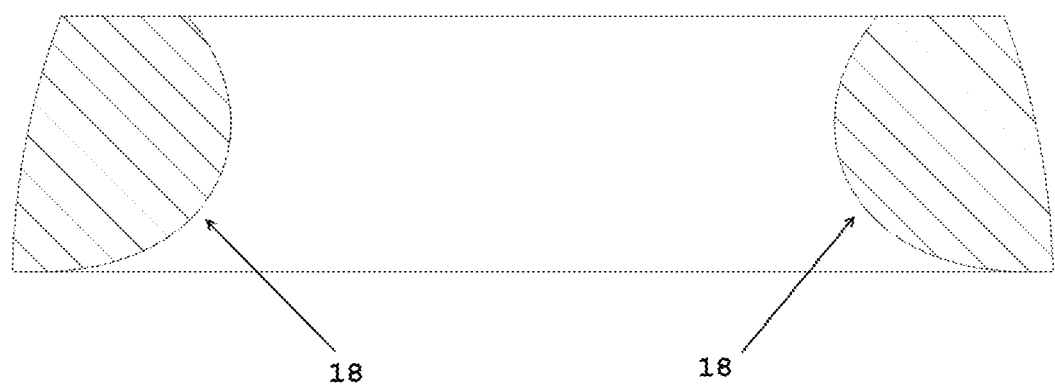
FIG. 8 illustrates a lateral cut of the structure, showing where the filter is applied, comprising the following elements:
18—filter.

The present device operates with two combined flows as indicated in FIG. 4, the lower flow (5) and the upper flow (11).

In the upper flow (11), the fluid becomes attached to the surfaces of the aerodynamic profile (1; 9) and is directed upwards to the tip of the blades (3) of the central rotor (2), regardless of the angle of incidence of the wind in the structure. The air is accelerated by the shape of inverted wing as it approaches the central rotor (2).

The rotor (2) is located in the center of the diffuser that is supported by a support structure (12) and fixed to the ground by a mounting mast (7).

The combined flow is caused by the combination of the upper and lower flow. At the top of the structure there is an aerodynamic brim deflector (6) that generates vorticity (10) that, on the other hand, generates a low pressure zone over the central rotor (2), which enhances the speed of the exhaust flow (11).

In a preferred embodiment of the invention, the device of the invention can make use of aerodynamic elements to improve the performance and minimize the losses resulting from directing the flow to the central turbine (2; 3). Due to its inverted wing aerodynamic shape, the flow adhesion along the structure's outside surface is promoted, and therefore, a filter (18) is therein installed helping to capture air particles and pollutants. The filter (18) is installed in the outside surface of the structure by means of a mechanical connection. In one embodiment, the filter (18) is installed in the lower part of the motionless structure. In another embodiment, the filter (18) is based on electrostatic, High efficiency particulate air (HEPA) or Activated Carbon Technology.

The central rotor (2) can use blades (3) of variable pitch. With this use, the system automatically optimizes the produced power for a determined wind speed and rotation of the central rotor (2).

As it is evident, the central rotor (2) used in the device according to the invention may assume different aerodynamic profiles as well as the number of blades (3) can vary in order to obtain better results for a specific usage, namely 2, 3, 4, 5, 6, 7, 8, 9 blades as well as a twin rotor.

The structure (1) may be made with aerodynamic profiles of different shapes. The shape and the angles of attack in relation to the approaching flow are, thus, variable. In the same way the same invention can be conceived so that the air intake can, alternatively, direct the flow in a descending direction. The structure (1) is hollow body, and is formed by a support structure (12) and a cover (13), being the cover (13) mounted in the support structure (12) through a fixation mechanism (17), for example of a screw type. The detachment between support structure (12) and cover (13) allows the use of the interior space of the motionless structure (1) as a storage medium for, but not exclusively to, electronic components, such as batteries (15) or communication devices. These components will be supplied directly from the energy produced by the turbine by means of an electronic supply adaptation circuit, also installed inside the diffuser, connected to energy transforming element. In one embodiment, the energy transforming element is an electrical generator.

The structure (1) can be fabricated in a solid version in a metal such as steel, aluminum or fiberglass composite. Due to the fact that telecommunication devices can be stored inside the structure (1), in one embodiment, it can be fabricated in a radiofrequency-wave-transparent material.

The structure (1) can be made also with reinforced building materials such as concrete that can be used for larger scales or in environments such as water. The structure can be also manufactured with flexible materials like a sail, or a wing where the shape is made from sections and covered by a resistant film. This method has the advantage of presenting a very low weight and can be more economically viable for some scales of the product.

In an embodiment of the invention, the combined omnidirectional flow turbine system comprises lighting systems, such as LEDs (16).

In an embodiment of the invention, the motionless structure of the omnidirectional flow turbine system is covered—in the top surface of the cover (13)—with photovoltaic cells (14).

In one specific embodiment, the omnidirectional flow turbine system is embedded with lighting systems resulting on an interior and/or exterior luminaire. In such case, the lighting systems can be embedded on the inverted radial wing, being fed from the energy produced by the turbine and additional power sources, such as from the photovoltaic cells (14) mounted on the cover's (13) top surface of the motionless structure (1).

In an embodiment of the invention, the combined omnidirectional flow turbine system comprises at least two rotors with contra rotation. In this application, it is considered that contra rotation is the fact that the rotors move in opposite directions.

In an embodiment of the invention, the combined omnidirectional flow turbine system comprises a Peltier device—thermoelectric generator—to explore the thermal difference between its components in order to generate additional power. In one embodiment, the Peltier device can be connected to the hot surface of the photovoltaic cells (14) and/or LED lighting (16) and to a cold surface of the outer surface of the motionless structure (1).

The above described preferred embodiments are obviously combinable among themselves. The following claims additionally define preferred embodiments of the present invention.

The invention claimed is:

1. A combined omnidirectional flow turbine comprising:
   one or more rotors placed in a vertical position, each of the one or more rotors including blades;
   an energy transformation element connected to the one or more rotors to convert mechanical energy to electrical energy;
   a motionless structure comprising an aerodynamic element, the aerodynamic element having a shape of an inverted radial wing surrounding laterally the one or more rotors therein and including an outer sidewall surface and an inner sidewall surface, said inner sidewall surface being continuously curved and bulging inwardly extending in a direction toward the one or more rotors from bottom intake flow to top exhaust flow, said motionless structure being a hollow body comprising:
      a support structure and a cover, wherein said support structure comprises an interior space configured to store at least one electronic component, wherein the support structure is connected to a vertical mounting mast, and said cover mounted to the support structure; and
      an electronic supply adaptation circuit, connected to the energy transformation element, configured to actuate said at least one electronic component;
   wherein the aerodynamic element with the shape of the inverted radial wing promotes creation of a combined air flow comprising a lower air flow and an upper air flow, the lower air flow directed in an ascending direction towards an entire area of the one or more rotors due to an aspiration effect caused by the combined lower air flow, and the upper air flow passing through a top exhaust of the aerodynamic element,
   wherein the motionless structure comprises at least one filter installed on the outer sidewall surface of the motionless structure.

2. The turbine according to claim 1, wherein the at least one filter is selected from an electrostatic filter, a high efficiency particulate air filter or Activated Carbon Technology filter.

3. The turbine according to claim 1, wherein the motionless structure further comprises an aerodynamic deflector with a brim on an upper portion of the motionless structure.

4. The turbine according to claim 1, wherein the at least one filter is installed on a lower part of the motionless structure.

5. The turbine according to claim 1, the motionless structure comprises one or more aerodynamic elements.

6. The turbine according to claim 1, wherein the blades of the one or more rotors comprise composite materials, magnesium alloys or injected polymers.

7. The turbine according to claim 1, wherein the turbine employs secondary flows from HVAC systems.

8. The turbine according to claim 1, wherein the energy transformation element is disposed in a center area of the turbine or at a ground level area of the turbine.

9. The turbine according to claim 1, wherein the energy transformation element is an electric generator.

10. The turbine according to claim 1, wherein the outer sidewall surface is covered with photovoltaic cells.

11. The turbine according to claim 1, wherein the motionless structure comprises a metallic material, a composite material, a concrete or textile material.

12. The turbine according to claim 1, wherein the motionless structure outer sidewall surface is of a radiofrequency-wave-transparent material.

13. The turbine according to claim 1, comprising lighting systems mounted in a lower part of the motionless structure.

14. A luminaire comprising the turbine as described in claim 1.

* * * * *